United States Patent
Kim (10) Patent No.: US 6,393,558 B1
(45) Date of Patent: May 21, 2002

(54) PERIPHERAL COMPONENT INTERCONNECT (PCI) CARD FOR SELECTIVELY PROCESSING A PCI BUS RESET SIGNAL AND METHOD FOR RESETTING THE PCI CARD

(75) Inventor: Jun-Hwa Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/361,181

(22) Filed: Jul. 27, 1999

(30) Foreign Application Priority Data

Jul. 29, 1998 (KR) .............................. 98-30484

(51) Int. Cl.⁷ ............................................. G06F 1/24
(52) U.S. Cl. ....................................................... 713/1
(58) Field of Search ....................... 713/1, 100; 710/8, 710/10

(56) References Cited

U.S. PATENT DOCUMENTS 5,948,090 A * 9/1999 Heinrich et al. ............ 710/128
6,073,196 A * 6/2000 Goodrum et al. ........... 710/103
6,098,132 A * 8/2000 Olarig et al. ................ 710/103

* cited by examiner

Primary Examiner—Thomas M. Heckler
(74) Attorney, Agent, or Firm—Robert E. Bushnell, Esq.

(57) ABSTRACT

A PCI card for selectively processing PCI bus reset signal and a method for resetting PCI card are disclosed. In a PCI card of a computer system having PCI bus, the PCI card for selectively processing PCI bus reset signal includes: reset control circuit unit which is connected to the PCI bus and decides whether to reset the PCI card or ignore the received reset signal according to the received reset signal and outputs the decided result when a reset signal is received from the computer system through the PCI bus; CPU controlling the reset control circuit unit; memory unit including firmware diagnosing whether each component of the PCI card works normally or not and reporting the result of the diagnosing to the CPU, supposed that the reset signal of the PCI card is received from the CPU; and power module for supplying power to the PCI card.

12 Claims, 6 Drawing Sheets

PERIPHERAL COMPONENT INTERCONNECT (PCI) CARD FOR SELECTIVELY PROCESSING A PCI BUS RESET SIGNAL AND METHOD FOR RESETTING THE PCI CARD

CLAIM OF PRIORITY

This application makes reference to, incorporates the same herein, and claims all benefits accruing under 35 U.S.C §119 from an application entitled Peripheral Component Interconnect (PCI) Card For Selectively Processing A PCI Bus Reset Signal And Method For Resetting The PCI Card earlier filed in the Korean Industrial Property Office on Jul. 29, 1998, and there duly assigned Serial No. 98-30484 by that Office.

FIELD OF THE INVENTION

The present invention relates to a peripheral component interconnect (PCI) card for selectively processing a PCI bus reset signal and a method for resetting a PCI card and in particular to a PCI card and a method to make the PCI card continuously operate by ignoring the reset signal when the state of the PCI card is normal when the reset signal is received from a computer system having the PCI bus.

DESCRIPTION OF THE RELATED ART

A computer having a PCI bus is a principal body to a PCI card and the PCI card is dependent on the computer having the PCI bus. The PCI card does not independently determine whether or not to accept a reset signal of the computer system, and it is reset by a reset signal through the PCI bus. However, there is a problem in that if an apparatus for power is included in the PCI card so as to be operated independently to the computer having the PCI bus and the PCI card is reset whenever the computer having the PCI bus sends the reset signal, then memories, for example, managed within the PCI card are all initialized and all data, such as previous status information, etc., are lost.

SUMMARY OF THE INVENTION

The present invention is intended to provide a PCI card for selectively processing a PCI bus reset signal and a method for resetting the PCI card to make the PCI card continuously operate by ignoring the reset signal if the state of the PCI card is normal when the reset signal is received from a computer system having the PCI bus.

A preferable embodiment of a PCI card according to the present invention includes: a reset control circuit unit which is connected to the PCI bus and decides whether to reset the PCI card or ignore the received reset signal according to the received reset signal and outputs the decided result when are set signal is received from the computer system through the PCI bus; a central processing unit (CPU) controlling the reset control circuit unit; a memory unit including firmware diagnosing whether each component of the PCI card works normally or not and reporting the result of the diagnosing to the CPU, supposed that the reset signal of the PCI card is received from the CPU; and power module for supplying power to the PCI card.

According to the preferable embodiment of the present invention, the reset control circuit unit includes: an input for receiving the reset signal from the computer system through the PCI bus; an inhibit register (latch) that receives a control signal indicating whether or not the reset signal is to be ignored, i.e., "perform the reset" or "ignore the reset signal," and receives a write signal from the CPU as an ENABLE signal, and receives a Vcc_PWR.GOOD signal and outputs the control signal, wherein the Vcc_PWR.GOOD signal is a signal representing that the power is being supplied to the power module of the PCI card; and an AND gate performing logical product by receiving the reset signal and the output control signal of the inhibit register, and outputting the result of the logical product to the CPU in the PCI card.

The reset control circuit unit further comprises a reset store register for storing, if the reset signal is received, the received reset signal and the Vcc_PWR.GOOD signal at the received time. The inhibit register does not change the once determined state whether to reset the PCI card until the Vcc_PWR.GOOD signal is input again.

The state of the inhibit register changes to the reset state if it is diagnosed that a problem has occurred in any of the components of the PCI card as a result of a diagnosis by the firmware.

The state of the inhibit register changes to the state of ignoring the reset signal when it is diagnosed that the PCI card operates normally as a result of the diagnosis by the firmware.

Other preferable embodiment of a method for selectively processing PCI bus reset signal in a computer system having PCI bus according to the present invention includes the steps of: supplying the PCI card with power, wherein the PCI card is within the computer system independently to the computer system; when a reset signal is received from the computer system through the PCI bus, deciding whether to reset the PCI card or ignore the received reset signal, and outputting the decided result; diagnosing whether each component of the PCI card works normally or not, and reporting the diagnosis result to a CPU, wherein the CPU controls whether to reset the PCI card or ignore the received reset signal according to the received reset signal; performing reset of the PCI card when it is diagnosed that a problem has occurred in any of components of the PCI card as a result of the diagnosing; ignoring the reset signal received from the computer system and making PCI card keep operating if it is diagnosed that the PCI card operates normally as a result of the diagnosing.

According to the preferable embodiment of the present invention, the step of deciding whether to reset the PCI card or ignore the received reset signal received from the computer system includes the steps of: receiving the reset signal from the computer system through the PCI bus; receiving a control signal indicating whether to perform the reset or to ignore the reset signal, and receiving a write signal from the CPU as an enable signal, and receiving a Vcc_PWR.GOOD signal and outputting the control signal, wherein the Vcc_PWR.GOOD signal is a signal representing that the power is being supplied to the power module of the PCI card; and performing a logical product operation by receiving the reset signal received from the computer system and by receiving the control signal output as a value indicating whether to perform the reset or to ignore the reset signal, and outputting the result of the logical product operation to the CPU within the PCI card.

The step of deciding whether to reset the PCI card or ignore the received reset signal, in response to the reset signal received from the computer system, establishes a state as PCI card reset state if the Vcc_PWR.GOOD signal is input for the first time, and does not change the established state until the Vcc_PWR.GOOD signal is input again.

A step of storing, if the reset signal is received from the computer system through the PCI bus, the received reset signal and the Vcc_PWR.GOOD signal at the receive time in a reset store register is further included.

The step of diagnosing whether each component of the PCI card works normally or not includes the steps of: checking whether the reset state is established by a reset command received from the computer system by checking the value stored in the reset store register; initializing the components of the PCI card if it is not reset by the system reset command, and checking whether the reset state is established in response to the PCI card being supplied with power; initializing the components of the PCI card if the reset is in connection with supplying the PCI card with power by the check, and checking whether there is a problem in initialization if the reset is not in connection with supplying the PCI card with power; changing the state, which is established for the reset of the PCI card, to a performing reset state if a problem has occurred in initialization, and changing the state, which is established for the reset of the PCI card, to a state of ignoring the reset if a problem has not occurred in initialization; and performing the remaining initialization steps after changing the state.

When a problem has occurred in one of the components of the PCI card, the method includes the steps of: activating an interrupt handler for the problem component(s); analyzing by the interrupt handler whether the problem is to be solved only if the PCI card is to be used; and as a result of the analyzing, if it is determined that the reset for the PCI card is needed, changing the state, which is established for the reset of the PCI card, to the reset state, and if it is determined that the reset is not needed, regarding the corresponding component as error and terminating the method.

BRIEF DESCRIPTION OF THE DRAWINGS

A more complete appreciation of the present invention, and many of the attendant s advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
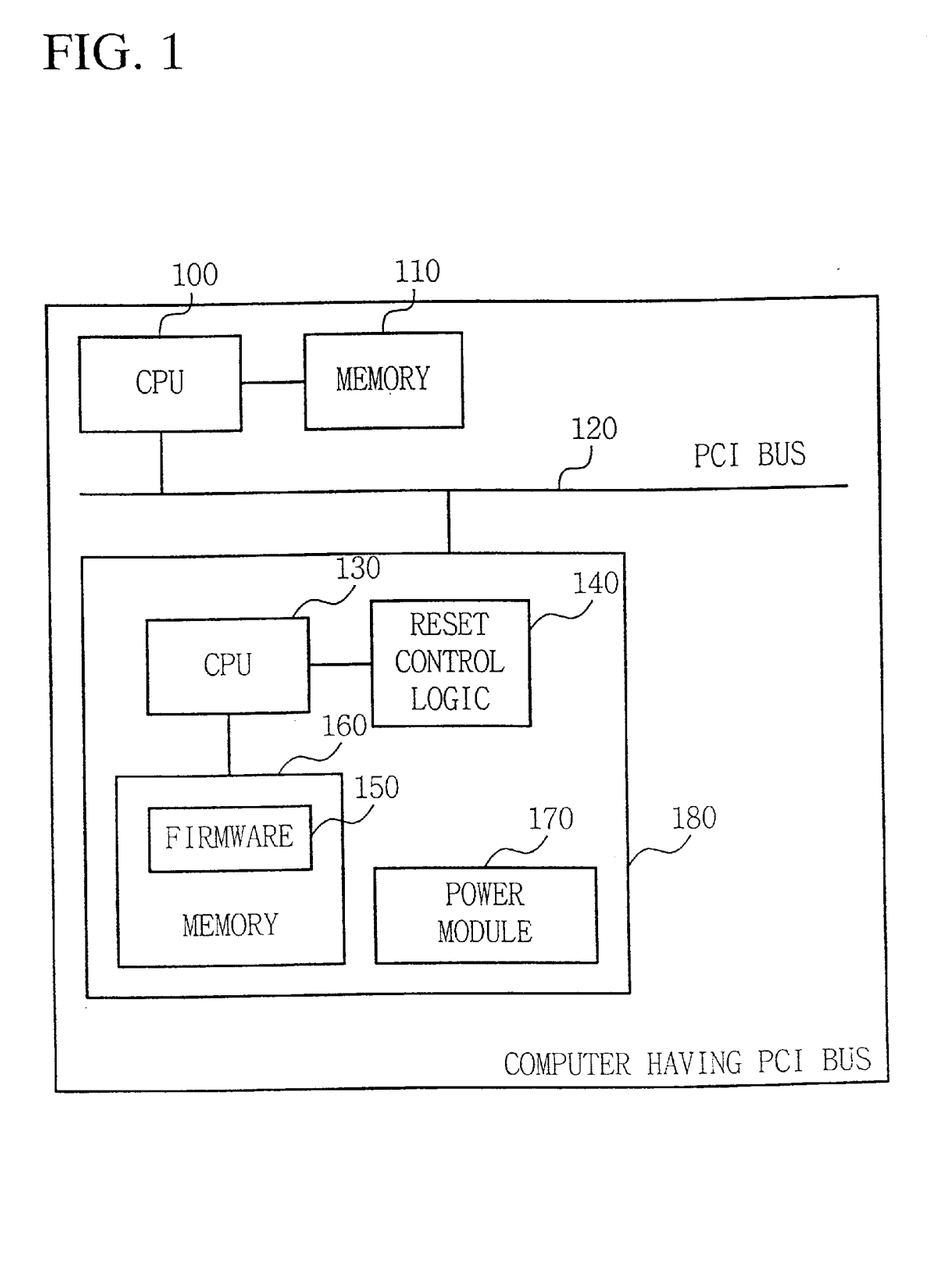
FIG. 1 illustrates a structure of a computer system having a PCI bus according to the present invention.

FIG. 1 illustrates a structure of a computer system having a PCI bus according to the present invention. Rreferring to FIG. 1, a PCI card 180 includes a reset control circuit unit 140 which decides, when a reset signal is received from the computer system, i.e., a CPU 100 and a memory 110, through a PCI bus 120, whether to reset the PCI card 180 or ignore the received reset signal in response to the received reset signal, and outputs the decided result, wherein the reset control circuit unit 140 is connected the PCI bus 120. A CPU 130 controls the reset control circuit unit 140. A memory unit 160 includes firmware for diagnosing whether each component of PCI card 180 works normally or not and reports the diagnosis result to CPU 130, when the reset signal of the PCI card 180 is received from CPU 100. A power module 170 supplies power to PCI card 180, the power module 170 being independent of the power supplied to CPU 100 and memory 110.

Figure 2:
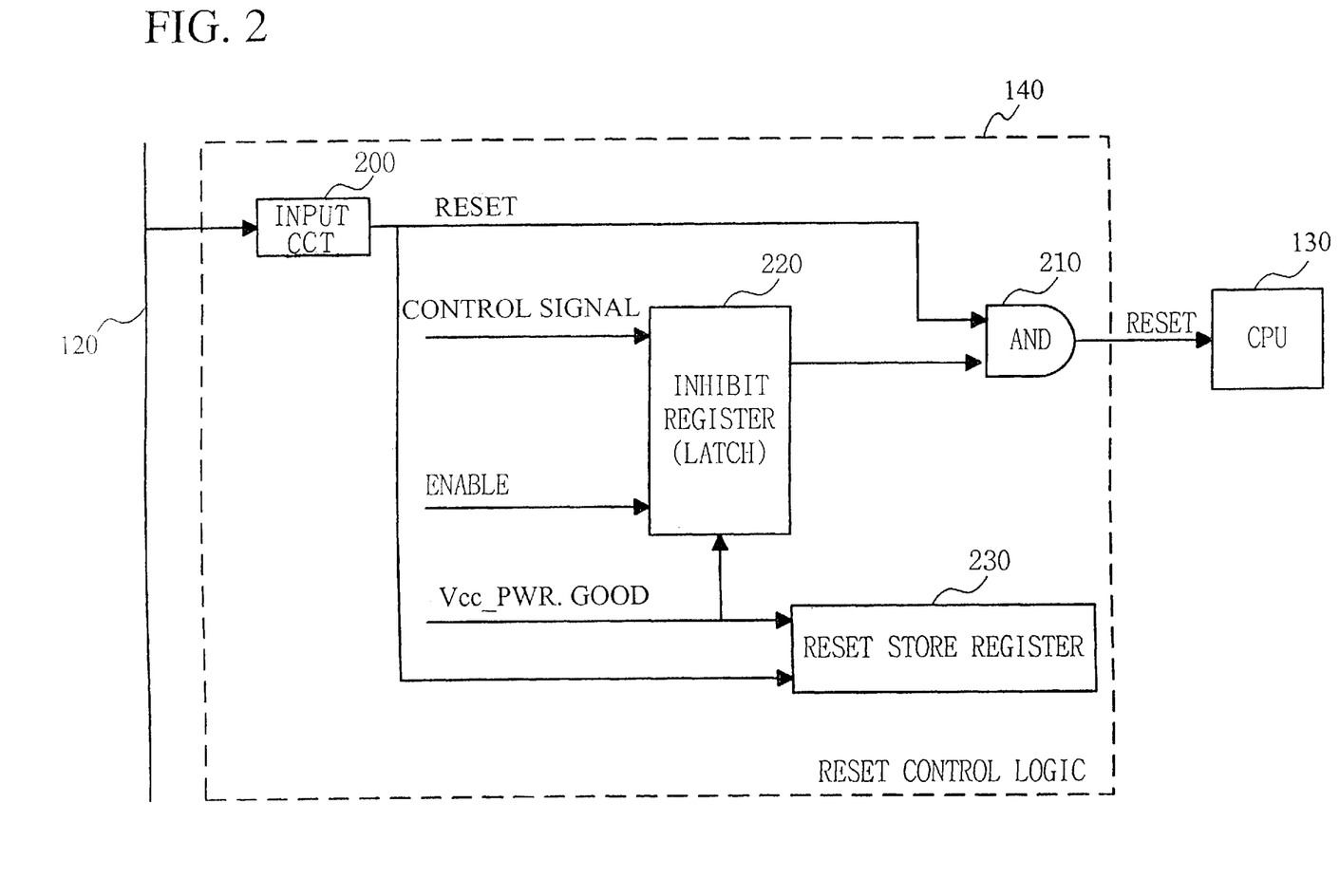
FIG. 2 illustrates a diagram of reset control circuit according to the present invention.

The reset control circuit unit 140, as illustrated in FIG. 2, includes an input circuit 200, e.g., a multiplexer if receiving more than the reset signal, for receiving the RESET signal from the computer system via PCI bus 120 and outputting the RESET signal; an inhibit register (latch) 220 for receiving a control signal indicative of the command 'perform reset' or the command 'ignore reset signal', for receiving a write signal from the CPU 130 as an ENABLE signal and for receiving a Vcc_PWR.GOOD signal and outputting either the 'perform reset' or 'ignore reset signal' as an output control signal, wherein write signal is a signal which is generated when CPU 130 writes data to a memory, thus when the data is the above mentioned control signal the inhibit register 220 is addressed by CPU 130 which in turn outputs the write signal as the ENABLE signal, also the Vcc_PWR.GOOD signal is a signal representing that the power is being supplied to the power module of the PCI card 180; and an AND gate 210 for performing a logical product by receiving the reset signal via input circuit 200 and the output control signal of the inhibit register, and outputting the result of the logical product to the CPU 130 in the PCI card 180. Additionally, the reset control circuit unit 140 further includes a reset store register 230 for storing, if the reset signal is received, the received reset signal and the Vcc_PWR.GOOD signal at the received time.

Figure 3A:
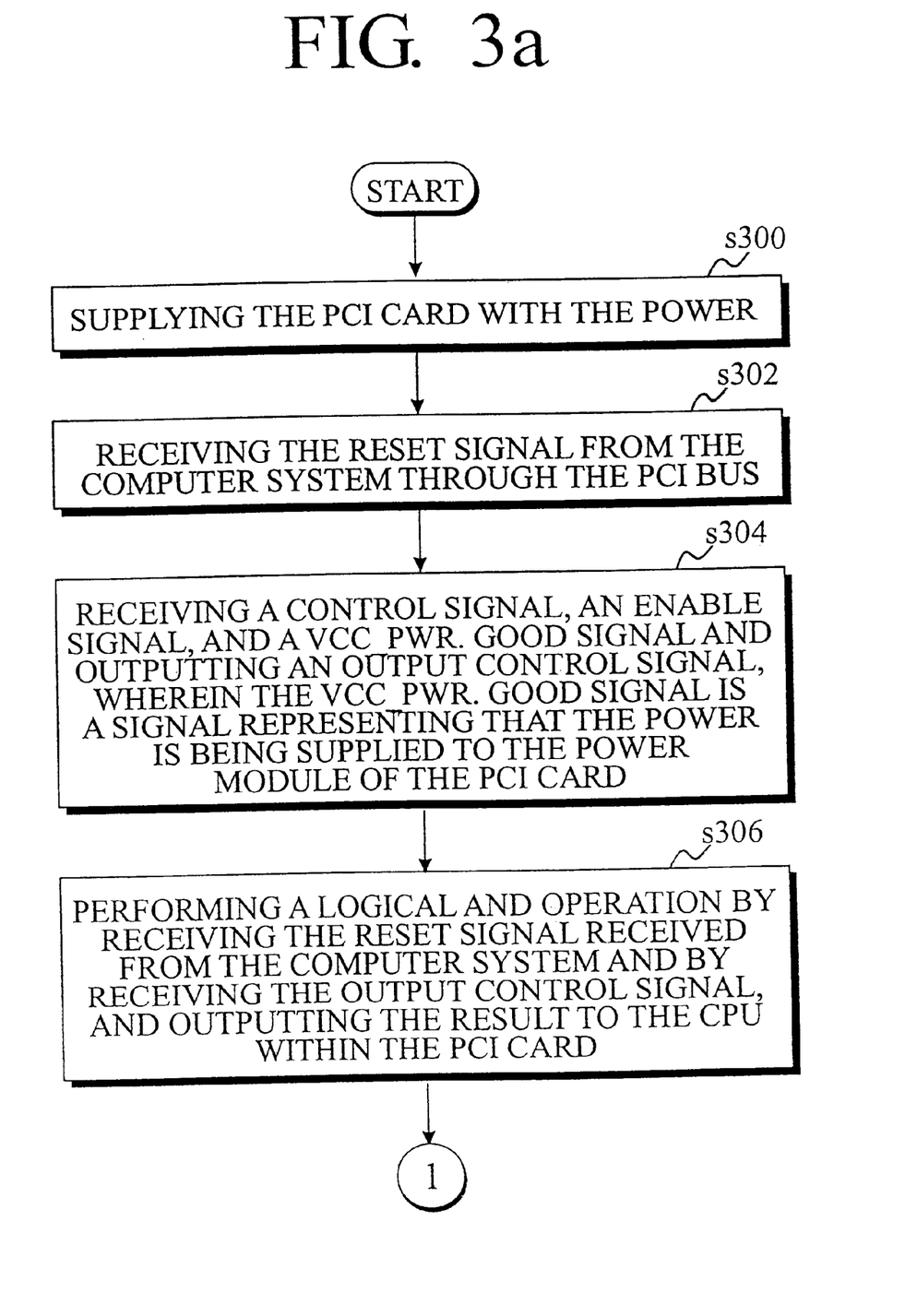
FIGS. 3a and 3b illustrate a flow chart a method for selectively processing PCI bus reset signal according to the present invention works.
Figure 3B:
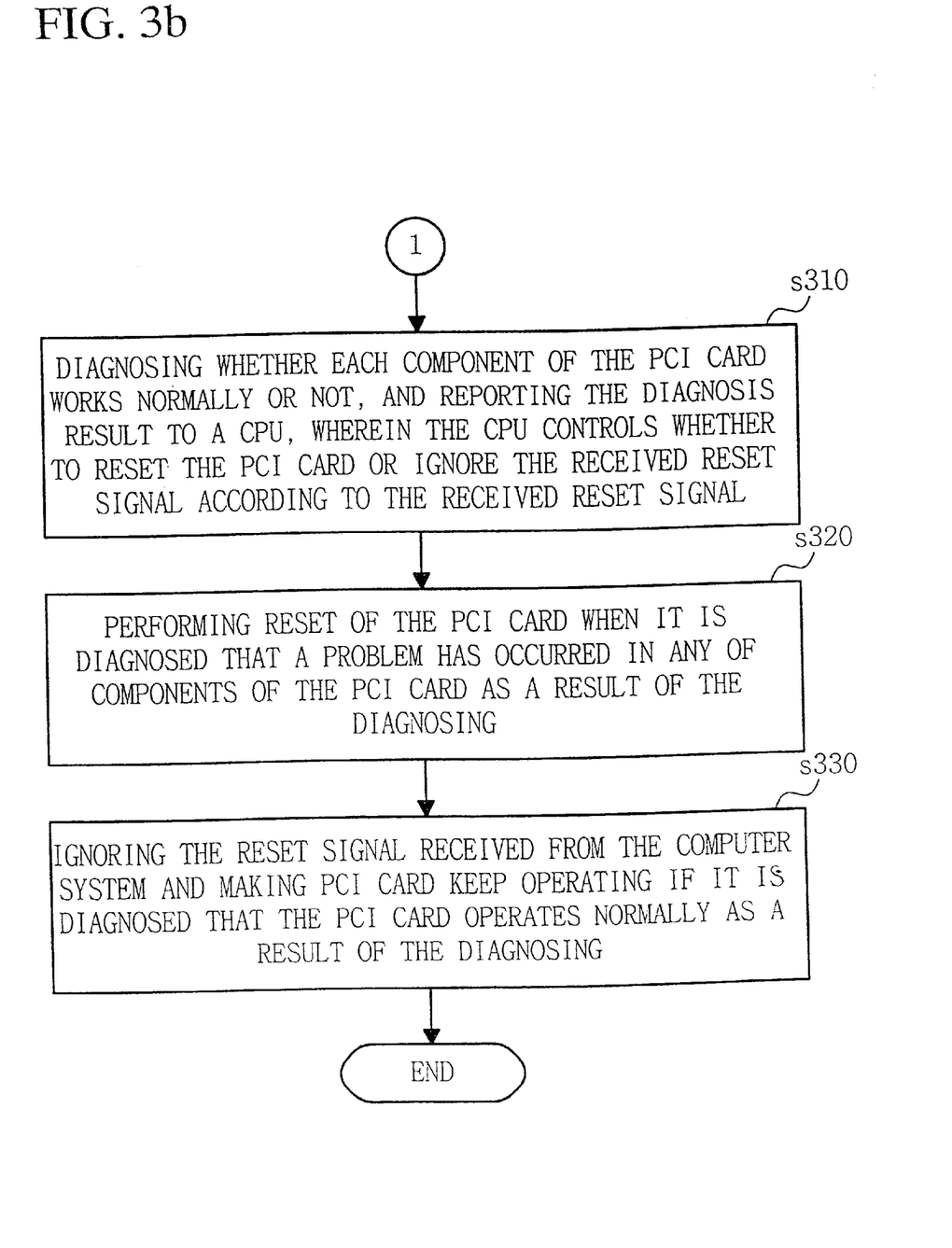

FIGS. 3a and 3b illustrate, by a flow chart, a method for selectively processing a PCI bus reset signal according to the present invention. In a PCI card 180 in a computer system having a PCI bus, a method for selectively processing, according to the present invention, a PCI bus reset signal in a computer system having PCI bus includes: supplying the PCI card 180 with power, the PCI card 180 being within the computer system and having a power source independent of the power applied to other components of the computer system; receiving the reset signal through the PCI bus; deciding whether to reset the PCI card 180 or ignore the received reset signal according to the received reset signal when a reset signal is received from the computer system through the PCI bus, and outputting the decided result; diagnosing whether each component of the PCI card 180 works normally or not, and reporting the diagnosis result to a CPU, wherein the CPU controls whether to reset the PCI card 180 or ignore the received reset signal according to the diagnosis result; performing a reset of the PCI card 180 when it is diagnosed that a problem has occurred in any of components of the PCI card 180 as a result of the diagnosis; ignoring the reset signal received from the computer system and making the PCI card 180 keep operating if it is diagnosed that all the components of the PCI card 180 are operating normally as a result of the diagnosis. The foregoing will be further described below.

After, in FIG. 3a, an initial step s300 of supplying the PCI card 180 with power, a decision is made regarding whether or not, when a reset signal is received from the computer system, to reset the PCI card 180 or ignore the received reset signal, this decision includes: a step s302 of receiving the reset signal from the computer system through the PCI bus; a step s304 of receiving, at inhibit register 220, a control signal regarding whether to 'perform the reset' or 'ignore the reset signal', receiving a write signal from the CPU as an ENABLE signal and receiving a Vcc_PWR.GOOD signal, and outputting an output control signal having a value indicating whether to 'perform the reset' or 'ignore the reset signal', wherein the Vcc_PWR.GOOD signal is a signal representing that the power is being supplied to the power module of the PCI card 180; and a step s306 of performing a logical AND operation by receiving the reset signal received from the computer system and by receiving the output control signal from the inhibit register 220, and outputting the result of the AND operation to CPU 130 within PCI card 180.

Then, as shown in FIG. 3b, there is a step s310 of diagnosing whether each component of the PCI card 180 works normally or not, and reporting the diagnosis result to CPU 130, wherein CPU 130 controls whether to reset PCI card 180 or ignore the received reset signal in response to the received reset signal; a step s320 of performing reset of the PCI card 180 when it is diagnosed that a problem has occurred in any of components of the PCI card 180 as a result of the diagnosing; or a step s330 of ignoring the reset signal received from the computer system and making PCI card 180 keep operating if it is diagnosed that the PCI card 180 operates normally as a result of the diagnosing.

When deciding whether to reset the PCI card 180 or ignore the received reset signal according to the reset signal received from the computer system, a PCI card 180 reset state is established if the Vcc_PWR.GOOD signal, see step s304, is input for the first time, and does not change the established state until the Vcc_PWR.GOOD signal is input again. The method according to the present invention further includes a step (not shown) of storing, if the reset signal is received from the computer system through the PCI bus, the received reset signal and the Vcc_PWR.GOOD signal at the received time in a reset store register.

Figure 4:
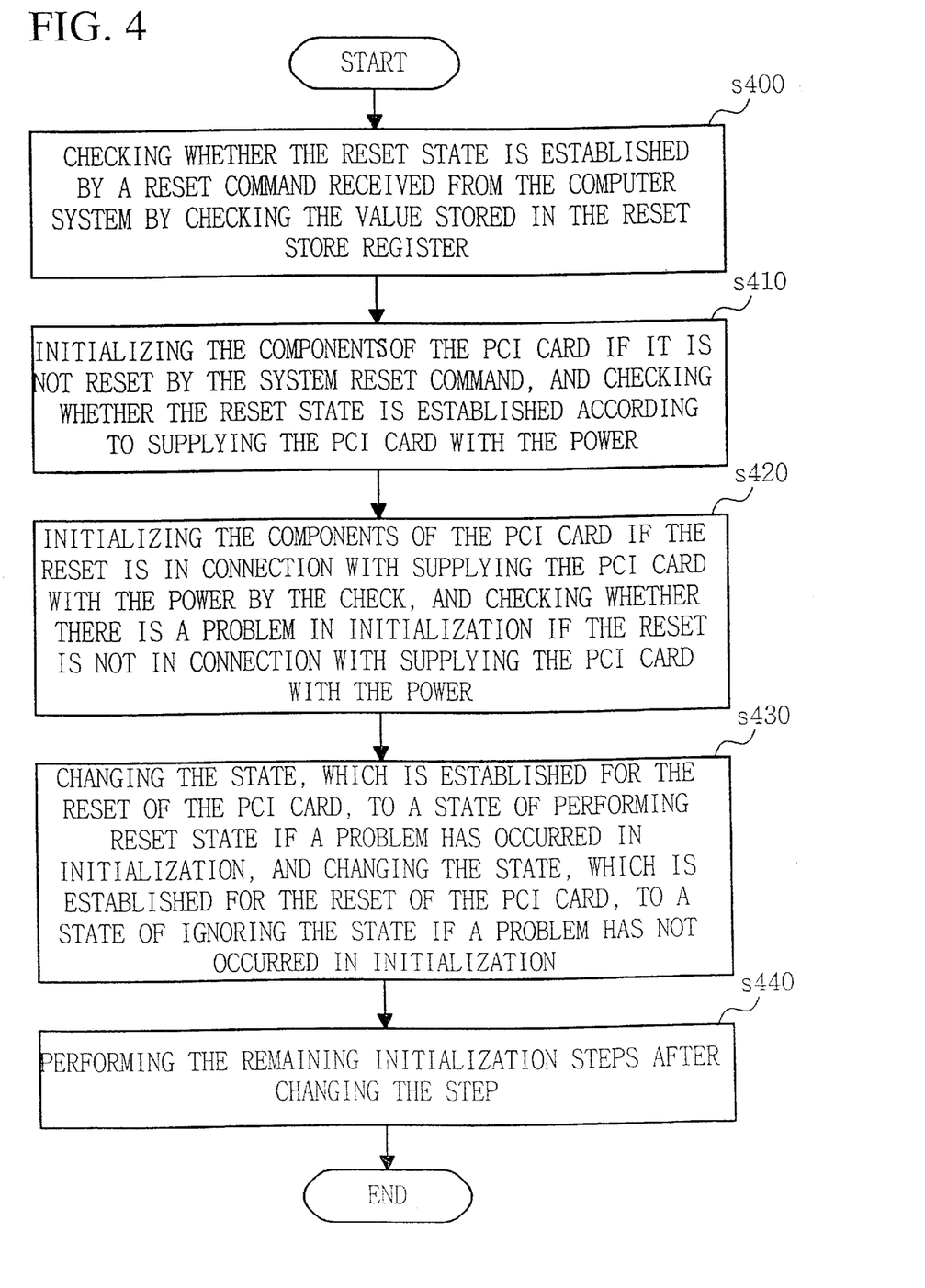
FIG. 4 shows a flow chart illustrating how to diagnose whether each component of the PCI card works normally or not.

FIG. 4 shows a flow chart illustrating how to diagnose whether each component of the PCI card 180 works normally or not. As illustrated in FIG. 4, the step s310 (FIG. 3b) of diagnosing whether each component of the PCI card 180 works normally or not includes: a step s400 of checking whether the reset state is established by a system reset command received from the computer system by checking the value of the reset signal stored in the reset store register 230; a step s410 of initializing the components of the PCI card 180 if it is not reset by the system reset command, and checking whether the reset state is established in response to supplying the PCI card 180 with power; a step s420 of initializing the components of the PCI card 180 if the reset is in connection with supplying the PCI card 180 with power by the check, and checking whether there is a problem in initialization if the reset is not in connection with supplying the PCI card 180 with power; a step s430 of changing the state, which is established for the reset of the PCI card 180, to a state of performing reset state if a problem has occurred in initialization, and changing the state, which is established for the reset of the PCI card 180, to a state of ignoring the rest if a problem has not occurred in initialization; and a step s440 of performing the remaining initialization steps after changing the step.

Figure 5:
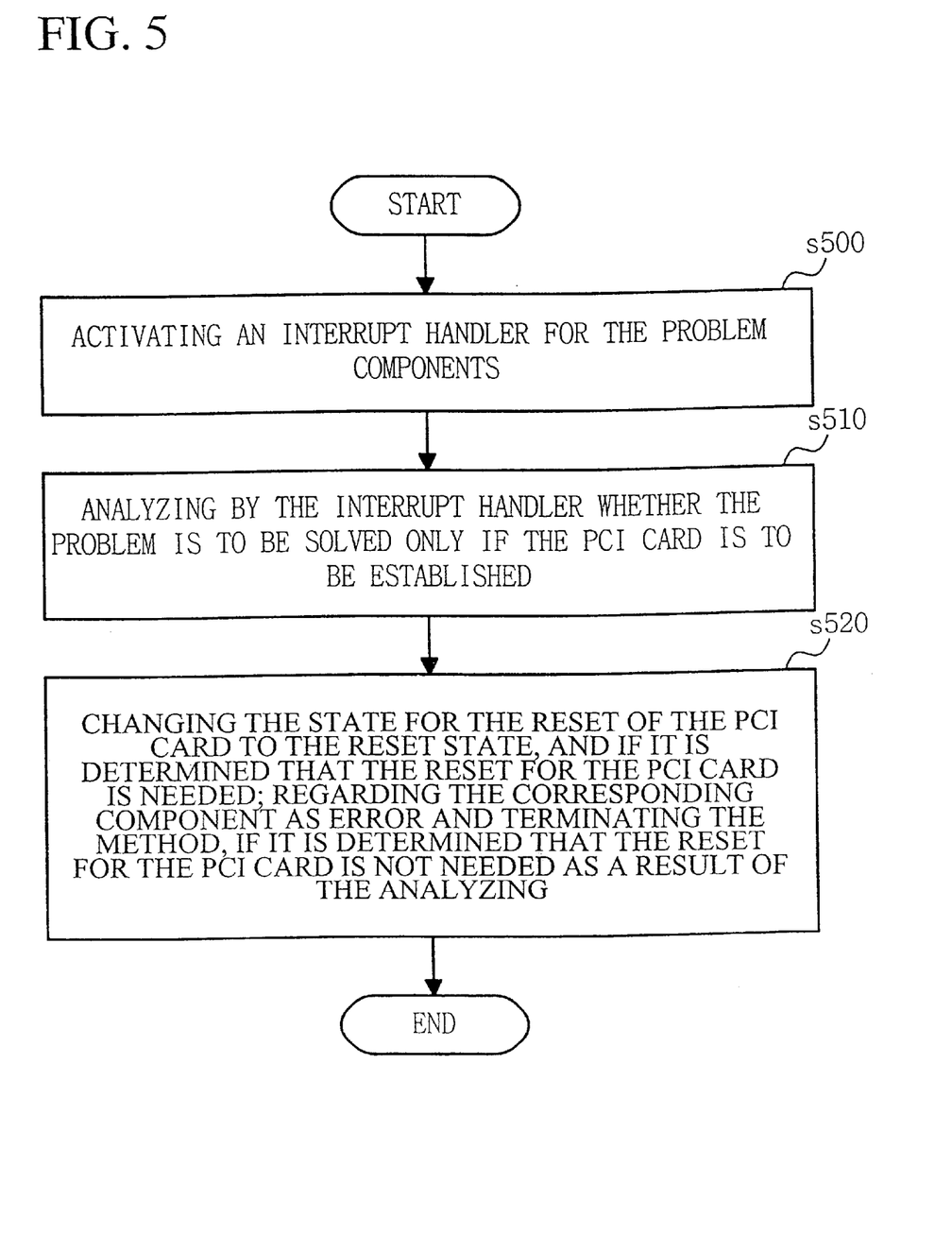
FIG. 5 illustrates a flow chart of error processing when a problem of hardware component has occurred according to the present invention.

FIG. 5 illustrates a flow chart of error processing when a problem with the hardware components has occurred according to the present invention. As illustrated in FIG. 5, when a problem has occurred in components of the PCI card 180, the method includes: a step s500 of activating an interrupt handler for the problem components; a step s510 of analyzing by the interrupt handler whether the problem is to be solved only if the PCI card 180 is to be used; and a step s520 of, as a result of the analyzing, if it is determined that the reset for the PCI card 180 is needed, changing the state of the reset of the PCI card 180 to the reset state, and if it is determined that the reset for the PCI card 180 is not needed, regarding the corresponding component as error and terminating the method.

As described above, the power is supplied to the PCI card 180, a signal is generated to inform that the power is supplied to the PCI card 180. At this time, the inhibit register is established to pass the reset. Therefore, if the PCI reset signal is received from the PCI card 180, it resets the PCI card 180 by generating the reset signal. After the PCI card 180 is reset, the firmware is loaded to the memory and starts to execute it. The firmware performs a diagnosis for each component of the PCI card 180 in accordance with specific diagnosis steps. If it is determined that the PCI card 180 works normally based on the diagnosis, the inhibit register is established to a state of no reset pass. Once the inhibit register is established to the state of no reset pass, the PCI card 180 works continuously without being reset, even if the reset signal is received through the PCI bus.

The once established inhibit register is maintained until the signal, which informs that the power is supplied to the PCI card 180, is generated again. However, if there is any one component having a problem among the components of the PCI card 180, the value of the inhibit register is changed to the state of reset pass so that the PCI card 180 can be reset if the PCI card 180 receives the reset signal and the reset can be automatically performed in case of the reset of the computer having the PCI bus.

As stated above, the present invention has an effect in that the invention makes it possible to continuously work the PCI card 180 by providing a method for ignoring the reset signal from the computer having the PCI bus. The present invention has another effect in that it can prevent the unnecessary loss of data by processing the reset signal in accordance with the state of the PCI card 180.

What is claimed is:

1. A peripheral component interconnect (PCI) card in a computer system having PCI bus, said PCI card selectively processing a reset signal received from said computer system through said PCI bus, said PCI card comprising:

a reset control circuit unit connected to said PCI bus for deciding whether to reset the PCI card or ignore the received reset signal in response to the received reset signal and outputting the decided result;

a central processing unit for controlling said reset control circuit unit, for receiving the decided result output by said reset control circuit unit and for resetting said PCI card, or not, based on said decided result;

a memory unit including firmware for diagnosing whether each component of the PCI card works normally or not and reporting the diagnosis result to said central processing unit, when the PCI card is reset by said central processing unit; and     a power module for supplying power to said PCI card.

2. The PCI card as set forth in claim 1, wherein said reset control circuit unit comprises:

an input for receiving the reset signal from the computer system through said PCI bus;

an inhibit register for receiving a control signal, indicating whether said reset signal should be ignored or not ignored, an enable signal from said central processing unit and a Vcc_PWR.GOOD signal and for outputting an output control signal having a value indicative of a reset state of said inhibit register, wherein said Vcc_PWR.GOOD signal is a signal representing that the power is being supplied to said power module of said PCI card and said reset state is one of an ignore reset signal state and a perform reset state; and an AND gate for performing a logical product by receiving the reset signal via said input and the output control signal of said inhibit register, and for outputting a result of the logical product to said central processing unit in said PCI card.

3. The PCI card as set forth in claim 2, wherein said reset control circuit unit further comprises a reset store register for storing the received reset signal and the Vcc_PWR.GOOD signal at the received time, when the reset signal is received.

4. The PCI card as set forth in claims 2, wherein said inhibit register does not change the reset state until the Vcc_PWR.GOOD signal is input a second time.

5. The PCI card as set forth in claim 4, wherein said inhibit register changes the reset state of the inhibit register to the perform reset state, when it is diagnosed that a problem has occurred in any component of the PCI card as a result of the diagnosis by said firmware.

6. The PCI card as set forth in claim 5, wherein said inhibit register changes the reset state of the inhibit register to the ignore the reset signal state when it is diagnosed that the PCI card operates normally as a result of the diagnosis by said firmware.

7. A method for selectively processing a reset signal applied to a peripheral component interconnect (PCI) card via a PCI bus in a computer system, said method comprising the steps of:

supplying the PCI card with power;

deciding, when a reset signal is received from said computer system through said PCI bus, whether to reset the PCI card or ignore the received reset signal in response to the received reset signal, and outputting the decided result to a central processing unit of said PCI card, said central processing unit outputting a control signal indicating whether to reset the PCI card or ignore the received reset signal;

diagnosing whether each component of the PCI card works normally or not, and reporting said diagnosis result to said central processing unit;

performing reset of the PCI card in response to the received reset signal when it is diagnosed that a problem has occurred in any of components of the PCI card as a result of said diagnosing step;

ignoring the reset signal received from said computer system and making the PCI card keep operating when it is diagnosed that the components of the PCI card operate normally as a result of said diagnosing step.

8. The method as set forth in claim 7, wherein said deciding step comprises the steps of:

receiving the reset signal from the computer system through said PCI bus;

receiving a control signal from said central processing unit, said control signal indicating whether to perform the reset or ignoring the reset signal, receiving a write signal from said central processing unit as an enable signal, and receiving a Vcc_PWR.GOOD signal and outputting an output control signal having a value indicating whether the reset signal is to be ignored or not, wherein said Vcc_PWR.GOOD signal is a signal representing that the power is being supplied to said power module of said PCI card; and performing a logical product operation by applying the reset signal received from the computer system and the output control signal to respective input terminals of an AND gate, and outputting the result of said logical product operation to the central processing unit of said PCI card.

9. The method as set forth in claim 8, wherein said deciding step establishes the state as a PCI card reset state when said Vcc_PWR.GOOD signal is input a first time, and does not change the established state until said Vcc_PWR.GOOD signal is input again.

10. The method as set forth in claims 8, wherein said method further comprises a step of storing, when the reset signal is received from the computer system through said PCI bus, the value of the received reset signal and the value of said Vcc_PWR.GOOD signal at the received time in a reset store register.

11. The method as set forth in claim 10, wherein said diagnosing step comprises the steps of:

checking whether the reset state is established by a reset command received from the computer system by checking the value stored in said reset store register;

initializing the components of the PCI card when it is not reset by the system reset command, and checking whether the reset state is established according to supplying the PCI card with power;

initializing the components of the PCI card if the reset is in connection with supplying the PCI card with power by said check, and checking whether there is a problem in initialization when the reset is not in connection with supplying the PCI card with power;

changing the state, which is established for the reset of the PCI card, to a state of performing the reset of the PCI card when a problem has occurred in initialization, and changing the state, which is established for the reset of the PCI card, to a state of ignoring the reset signal when a problem has not occurred in initialization; and performing the remaining initialization steps after changing said state.

12. The method as set forth in claim 11, wherein in case that a problem has occurred in components of said PCI card, the method further comprises the steps of:

activating an interrupt handler for the problem components;

analyzing by said interrupt handler whether the problem is to be solved only if the PCI card is to be established; and as a result of said analyzing, if it is determined that the reset for the PCI card is needed, changing the state, which is established for the reset of the PCI card, to the reset state, and if it is determined that the reset is not needed, regarding the corresponding component as error and terminating said method.

* * * * *